(12) United States Patent
Oba et al.

(10) Patent No.: US 6,389,903 B1
(45) Date of Patent: May 21, 2002

(54) PRESSURE-DETECTING DEVICE COUPLING MEMBER WITH INTERCHANGEABLE CONNECTOR PART

(75) Inventors: Nobukazu Oba, Chiryu; Makoto Hatanaka, Handa, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/365,757

(22) Filed: Aug. 3, 1999

(30) Foreign Application Priority Data

Aug. 4, 1998 (JP) ............................................ 10-220356

(51) Int. Cl.$^7$ ............................. G01L 7/00; G01L 9/00; H01R 31/06
(52) U.S. Cl. ............................. 73/756; 439/628; 73/754
(58) Field of Search ........................ 73/754, 756, 715, 73/720, 716, 726, 727, 700, 23.31, 31.05; 204/426; 29/621.1; 228/250; 338/4, 42; 439/628, 660

(56) References Cited

U.S. PATENT DOCUMENTS

| | | | |
|---|---|---|---|
| 5,174,014 A | * | 12/1992 | Erichsen et al. ............ 29/621.1 |
| 5,331,857 A | * | 7/1994 | Levine et al. ................. 73/756 |
| 6,082,175 A | * | 7/2000 | Yoshikawa et al. ........ 73/23.31 |

FOREIGN PATENT DOCUMENTS

| | | |
|---|---|---|
| JP | 63-168528 | 7/1988 |
| JP | 1-83280 | 6/1989 |
| JP | 4-134044 | 12/1992 |

* cited by examiner

Primary Examiner—Benjamin R. Fuller
Assistant Examiner—Abdullahi Aw-Musse
(74) Attorney, Agent, or Firm—Harness, Dickey & Pierce, PLC (57) ABSTRACT

A pressure-detecting device in which a pressure sensor unit having the same specifications can be used even when there are numerous different forms of an outside member to which connection leads of the pressure sensor unit are to be electrically connected. A pressure sensor unit has four connection leads exiting a sensor housing. A coupling member has a terminal holding part and a connector part molded integrally from an insulating material and having insert-molded coupling leads. The coupling leads have terminal plates, all exposed on the same side, and terminal pieces projecting outwardly. Multiple versions of the coupling member are made by integrally joining connector parts of different shapes to terminal holding parts all having terminal plates disposed in the same state. The pressure sensor unit is assembled to a coupling member selected from among these and the connection leads are electrically connected to an outside member by way of this coupling member.

24 Claims, 6 Drawing Sheets

PRESSURE-DETECTING DEVICE COUPLING MEMBER WITH INTERCHANGEABLE CONNECTOR PART

CROSS-REFERENCE TO RELATED APPLICATION

The present application is related to, and claims priority from, Japanese Patent Application No. 10-220356, the contents of which are incorporated herein by reference.

BACKGROUND OF THE INVENTION

1. Technical Field

This invention relates generally to pressure sensors, and more particularly to a pressure-detecting device having a pressure sensor unit with a plurality of connection leads exiting a sensor housing.

2. Related Art

Conventional pressure sensor units for performing pressure detection in vehicle hydraulic brake systems, common rail injectors of diesel engines and the like typically include a diaphragm and a pressure sensor chip responsive to diaphragm deformation disposed in a pressure-receiving end of a metal sensor housing, and a plurality of connection leads exit a base end of the case. The components to which the connection must be electrically connected include various different types of connectors and printed circuit boards. Because these outside members vary greatly in size and shape, it becomes necessary to variously change the exit positions and lengths and shapes of the connection leads according to the specifications of the different outside members.

As a result, it has in the past been necessary to prepare various different versions of pressure sensor units of which only the specifications of the connection leads differ. Therefore, the pressure sensor units are difficult to produce on a mass-production basis, and, as such units are relatively expensive devices, the associated cost is consequently increased.

In particular, the connection leads are often increased in length to conform to specifications of an outside member, as the leads are easily bent in the production or assembly stage. However, as a result, ease of assembly of the unit deteriorates, thereby resulting in increased assembly costs.

SUMMARY OF THE INVENTION

It is therefore an object of the present invention to provide a pressure-detecting device with which it is only necessary to prepare pressure sensor units conforming to a single specification, even when the connection leads of the pressure sensor units are to be electrically connected to outside members of numerous different shapes and sizes, and with which it is thus possible to realize cost reductions through mass-production and ease of unit assembly.

To achieve this and other objects, the invention provides a pressure-detecting device having a coupling member coupling member with a connector part shaped to match the form of the outside member to which the unit connection are electrically connected. The plurality of terminal plates of the coupling member and the plurality of connection leads of the pressure sensor unit are electrically connected by for example welding or soldering, but because the terminal plates are disposed in the same way, even when the version of the coupling member is different, the exit positions and lengths and shapes of the connection leads of all the pressure sensor units can be identical.

Therefore, even when there are numerous outside members of varying shapes to which the connection leads of pressure sensor units must be electrically connected, it is only necessary to prepare the pressure sensor units based on a single specification. As a result, it becomes possible to reduce the cost of the pressure sensor units through mass-production and hence reduce the overall cost of the device. Also, because the terminal plates are all exposed on the same side, the connection leads of the pressure sensor unit may be easily connected to the terminal plates. Moreover, because the length of the connection leads can be minimized, the risk of the connection leads bending in the production or assembly stage is minimized, thereby resulting in increased assembly yield and reduced production costs.

DETAILED DESCRIPTION OF THE PREFERRED EMBODIMENTS

A first preferred embodiment of the invention will now be described, with reference to FIGS. 1–8.

Figure 8:
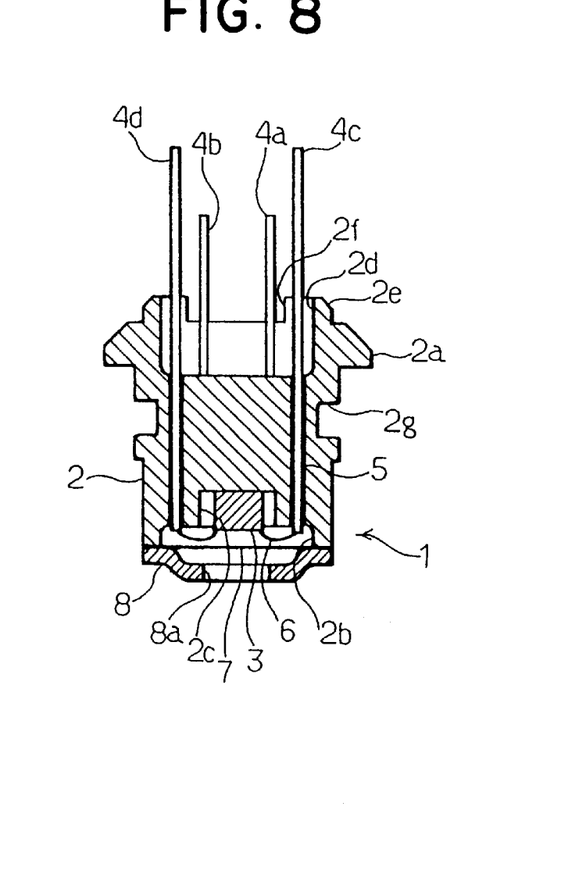
FIG. 8 is a sectional view of a pressure sensor unit of the first preferred embodiment.

FIG. 8 shows in cross-section the construction of a pressure sensor unit 1. As shown, a cylindrical metal sensor housing 2 has an annular flange part 2a informed integrally projecting from a base end thereof. In the end face of a pressure-receiving end (distal end) of the sensor housing 2 a relatively shallow concavity 2b and a sensor-mounting chamber 2c opening at the bottom face of the concavity 2b are formed. A semiconductor pressure sensor chip 3 of a known construction is die-bonded to the inside of the sensor-mounting chamber 2c using an adhesive. A relatively deep concavity 2d is formed in the base end of the sensor housing 2 and is surrounded by a cylindrical part 2e and a cutaway 2f is formed in the cylindrical part. Also, a circumferential groove 2g is formed in the outside of the sensor housing 2.

Four connection leads 4a–4d pass through the sensor housing 2 in its axial direction and are electrically insulated from the sensor housing 2. Specifically, the connection leads 4a–4d pass inside glass hermetic structures 5 through bores (not numbered in the figures) provided in the sensor housing 2 so that leading ends thereof are exposed inside the concavity 2b, while base ends thereof extend in the axial direction from the end face (the bottom of the concavity 2d) of the base end of the sensor housing 2. The connection leads 4a–4d are set to lengths which will be discussed later, and the connection leads 4a, 4b are shorter than the connection leads 4c, 4d.

Although it is not specifically illustrated in the figures, in practice the end faces of the leading ends of the connection leads 4a–4d are formed by, for example, squashing so as to have relatively large areas. The pressure sensor chip 3 is electrically connected to the leading end faces of the connection leads 4a–4d by bonding wires 6. The connection leads 4a,4c and 4d respectively function as a ground terminal, a power supply terminal and a signal output terminal for the pressure sensor chip 3, and the connection lead 4b is provided as a test terminal to be used during production of the pressure sensor chip 3.

A metal diaphragm 7 is disposed on the pressure-receiving end face of the sensor housing 2 so as to cover the concavity 2b and the sensor-mounting chamber 2c. The periphery of this diaphragm 7 is fixed in an airtight manner by for example welding, and a space (the concavity 2b and the sensor-mounting chamber 2c) covered by the diaphragm 7 is filled with for example silicone oil (not shown). Although it is not illustrated, the silicone oil is filled via a connecting hole formed in the sensor housing, with the connecting hole being subsequently sealed with an expander or the like. A metal cap 8 is fixed to the end face of the pressure-receiving end of the sensor housing 2 by for example welding so that it covers the diaphragm 7. A pressure-receiving port 8a is formed on the cap 8.

Figure 6:
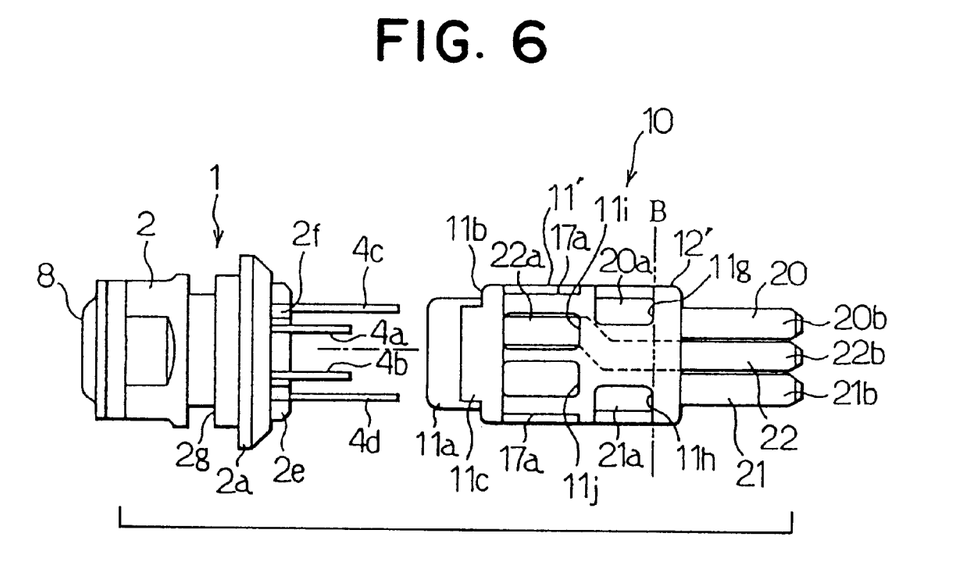
FIG. 6 is a plan view of a pressure-detecting device of the first preferred embodiment having a different coupling member before it is assembled.
Figure 7:
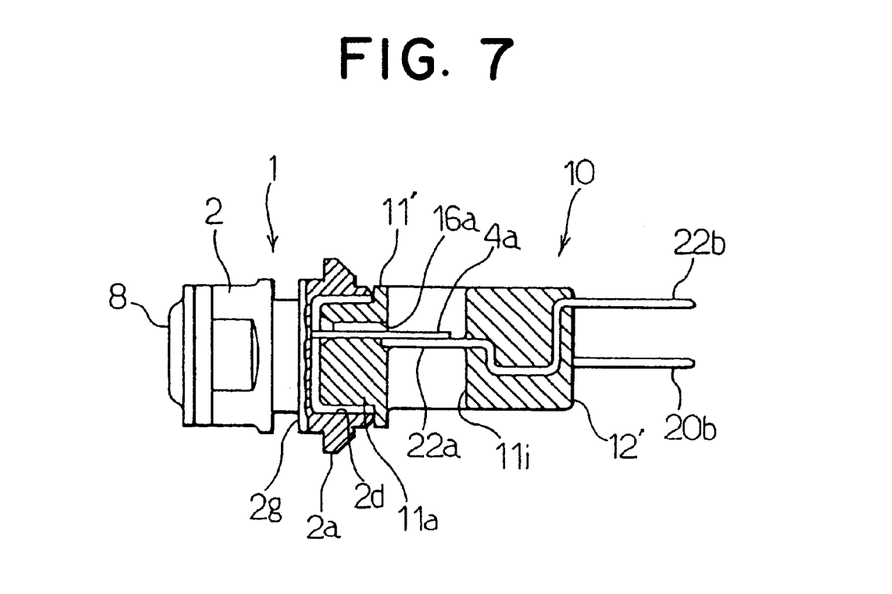
FIG. 7 is a partially sectional plan view of the same device in its assembled state.

A pressure sensor unit 1 thus constructed is mounted by way of a coupling member 9 of the kind shown in FIGS. 1–5, a coupling member 10 of the kind shown in FIG. 6 and FIG. 7, or a coupling member of some other shape not illustrated in the drawings. A construction of this mounting will now be described.

In FIGS. 1–5, the coupling member 9 has a terminal holding part 11 and a connector part 12 (the boundary between these is shown by the broken line A in FIG. 2), integrally molded from an insulating material such as resin. A connecting part 11a formed so that it will fit in the concavity 2d of the pressure sensor unit 1 when the pressure sensor unit 1 is assembled to the coupling member 9, is formed at the terminal holding part 11 side end of the coupling member 9. A step 11b (FIG. 2) is formed in the terminal holding part 11 by forming the base side (the side nearer the connector part 12) of the connecting part 11a larger in diameter than the rest of the connecting part 11a. The pressure sensor unit 1 and the coupling member 9 are then positioned in the axial direction with respect to each other via the step 11b abutting upon the end face of the cylindrical part 2e of the sensor housing 2 of the pressure sensor unit 1.

Figure 1:
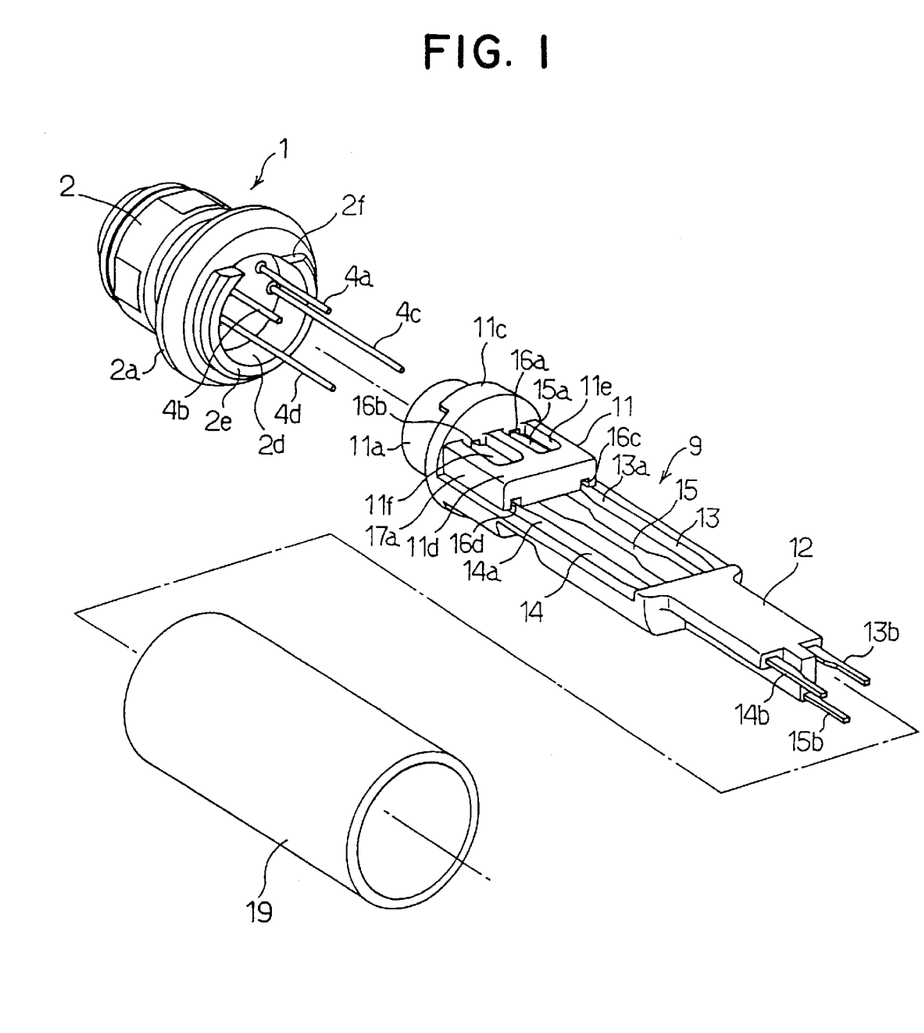
FIG. 1 is a perspective view of a pressure-detecting device of a first preferred embodiment of the invention before it is assembled.
Figure 2:
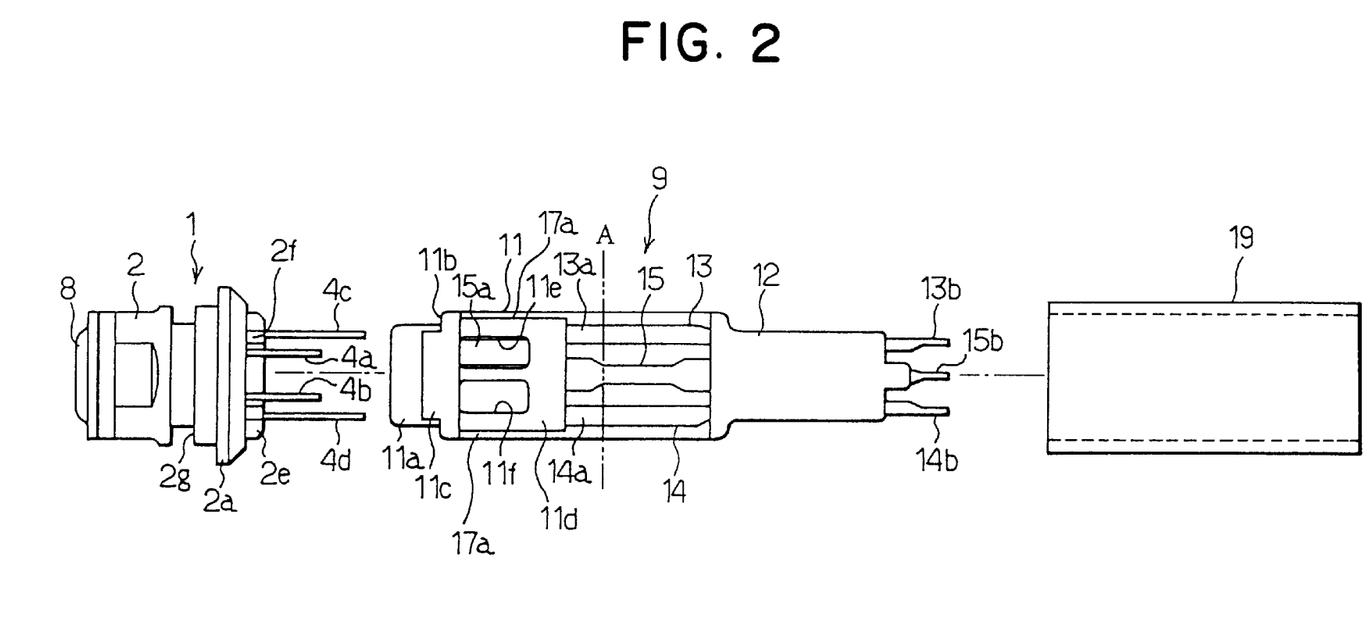
FIG. 2 is a plan view of the same device.

Also, a projection 11c shaped to fit in the cutaway 2f of the sensor housing 2 is linked with the step 11b, and the pressure sensor unit 1 and the coupling member 9 are positioned in the circumferential direction and prevented from rotating with respect to each other by interlocking of the projection 11c and the cutaway 2f.

Three coupling leads 13–15 are insert-molded in the coupling member 9. The coupling leads 13–15 all have one end exposed on the same side (hereinafter, this will be assumed to be the upper face side) in the terminal holding part 11, and function as terminal plates 13a–15a. The other end of the leads project to the outside from the end of the connector part 12, and function as terminal pieces 13b–15b. In this case, a shelflike part 11d is formed on the upper face of the terminal holding part 11, and a pair of concavities 11e, 11f are provided side-by-side in this shelflike part 11d. The coupling leads 13, 14 positioned near the sides of the coupling member 9 have terminal plates 13a, 14a entering the shelflike part 11d to a predetermined extent, and the coupling lead 15 positioned in the middle is longer than the other coupling leads 13, 14, is bent inside the shelflike part 11d and has its terminal plate 15a positioned inside the concavity 11e.

Also, a plurality of insertion holes 16a–16d (see FIGS. 1 and 5) into which the connection leads 4a–4d of the pressure sensor unit 1 are respectively inserted are formed in the terminal holding part 11, running from the concavity 11e (the terminal plate 15a), the concavity 11f and the terminal plates 13a, 14a to the pressure sensor unit 1 when assembled to the coupling member 9. Specifically, the insertion holes 16a, 16b are formed passing through the connecting part 11a so as to open at the concavity 11e (the terminal plate 15a) and the concavity 11f. The insertion holes 16c, 16d are formed passing through the connecting part 11a and the shelflike part 11d so as to open at the terminal plates 13a, 14a respectively.

The connection leads 4a through 4d are set to length dimensions such that when the pressure sensor unit 1 has been assembled to the coupling member 9 their ends reach the upper faces of the respective terminal plates 13a through 15a and the concavity 11f.

Figure 4:
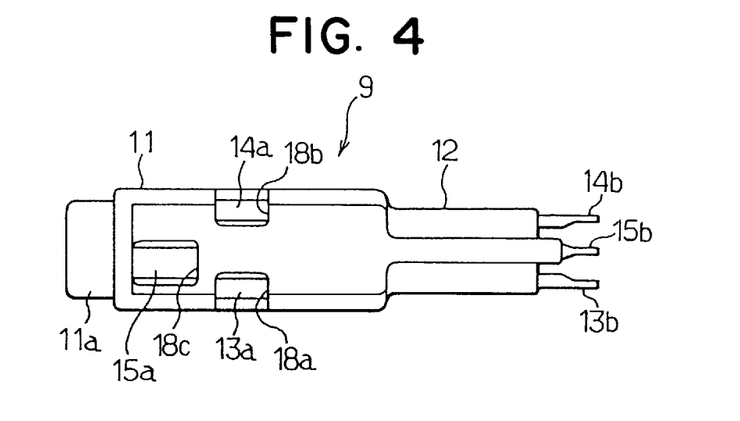
FIG. 4 is a bottom view of a coupling member of the device.
Figure 5:
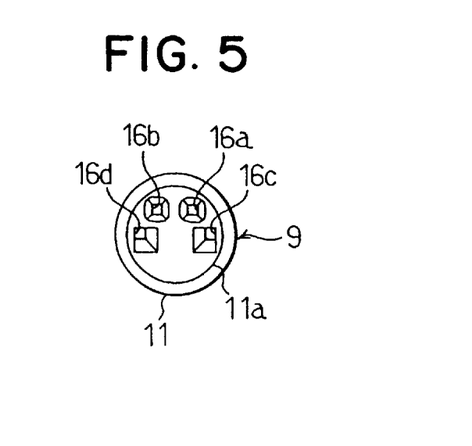
FIG. 5 is a front view of the coupling member.

A pair of vertical and mutually parallel flat faces 17a are formed on the outer sides of the terminal holding part 11, and particularly the sides of the shelflike part 11d, to facilitate gripping by means of a gripping jig. As shown in FIG. 4, apertures 18a–18c reaching the terminal plates 13a–15a are formed in the underside of the terminal holding part 11. Consequently, it is possible to push an electrode head for electrical welding against the terminal plates 13a–15a from both upper and lower sides.

A metal tubular sleeve 19 is optionally fitted around the coupling member 9 to cover at least the terminal holding part 11, and its internal diameter is set to be larger by a small amount than the external diameter of the cylindrical part 2e of the sensor housing 2.

Figure 3:
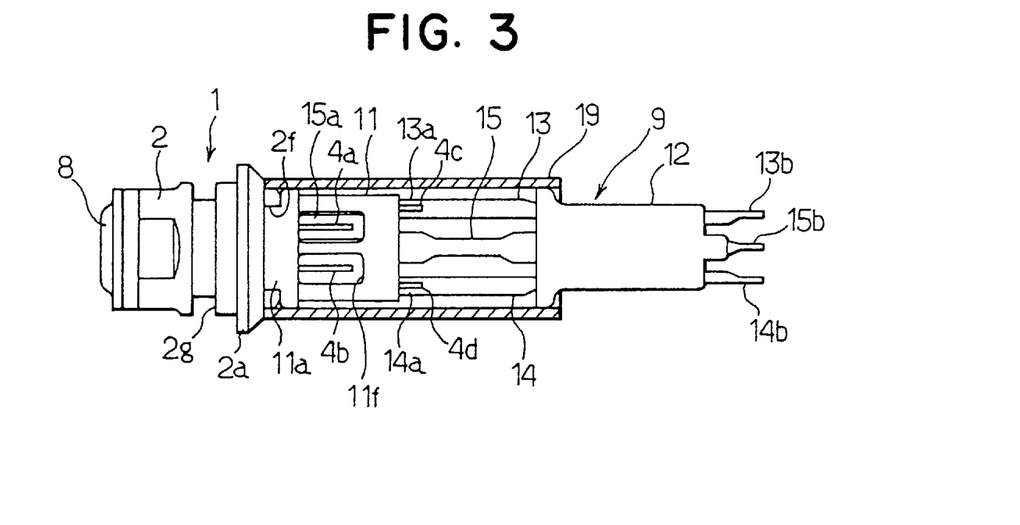
FIG. 3 is a partially sectional plan view of the device in its assembled state.

When the pressure sensor unit 1 is assembled to the coupling member 9, the connection leads 4a–4d of the pressure sensor unit 1 are inserted into the insertion holes 16a–16d of the coupling member 9, and the connecting part 11a of the coupling member 9 is fitted into the concavity 2d of the pressure sensor unit 1. At this time, the projection 11c of the coupling member 9 is interlocked with the cutaway 2f of the pressure sensor unit 1. When this is done, the ends of the connection leads 4a–4d reach the upper faces of the terminal plates 13a–15a and the concavity 11f, as shown in FIG. 3. The connection leads 4a–4c are then electrically connected to the terminal plates 13a–15a electrical welding or soldering.

Subsequently, the coupling member 9 is inserted into the sleeve 19, and the end of the sleeve 19 is fitted around the cylindrical part 2e of the sensor housing 2. The abutting portions of the sleeve end and the sensor housing 2 are joined for example by means of welding. Also, although not shown, the inside of the sleeve 19 is filled with an insulating resin material such as epoxy resin to cover the connections between the connection leads 4a–4c and the terminal plates 13a–15a in order to prevent moisture or the like from entering to around these connections.

Referring to FIGS. 6–7, on the other hand, a coupling member 10 has a terminal holding part 11' and a connector part 12' (the boundary between these is shown by the broken line B in FIG. 6), integrally molded from an insulating material such as resin. The terminal holding part 11' has a connecting part 11a, a step 11b, a projection 11c and flat faces 17a similar to those of the terminal holding part 11 of the coupling member 9.

Three coupling leads 20–22 are insert-molded in the coupling member 10. The coupling leads 20–22 all have one end exposed on the same side (the upper face side) in the terminal holding part 11', and function as terminal plates 20a–22a, with the other end projecting to the outside from the end of the connector part 12'. These ends function as terminal pieces 20b–22b. The terminal plates 20a–22a are disposed in exactly the same way as the terminal plates 13a–15a of the coupling member 9 described above.

The coupling leads 20, 21 positioned near the sides of the coupling member 10 have their terminal plates 20a, 21a positioned so that they front on cutaways 11g, 11h formed in the sides of the terminal holding part 11', whereby both the upper and lower sides of the terminal plates 20a, 21a are exposed. Through holes 11i, 11j are provided side-by-side in the terminal holding part 11', passing therethrough from top to bottom, and the terminal plate 22a of the coupling lead 22 is positioned in the through hole 11i, whereby both the upper and lower sides of the terminal plate 22a are exposed. As a result, it is possible to push an electrode head for electrical welding against the terminal plates 20a–22a from both upper and lower sides. The coupling lead 22 positioned in the middle is longer than the other coupling leads 20, 21 and is bent inside the terminal holding part 11' as shown in FIG. 6 and FIG. 7.

Also, a total of four insertion holes, into which the connection leads 4a–4d of the pressure sensor unit 1 are inserted (in FIG. 7, only an insertion hole 16a, into which the connection lead 4a is inserted, is shown), are formed to open at the through holes 11i, 11j and the cutaways 11g, 11h.

When the pressure sensor unit 1 is assembled to the coupling member 10, as shown in FIG. 7, the connection leads 4a–4d of the pressure sensor unit 1 are inserted into the insertion holes (of which only 16a is shown) of the coupling member 10, and the connecting part 11a of the coupling member 10 is fitted in the concavity 2d of the pressure sensor unit 1. At this time, the projection 11c of the coupling member 10 is made to interlock with the cutaway 2f of the pressure sensor unit 1. When this is done, the ends of the connection leads 4a–4d reach the upper faces of the terminal plates 20a–22a and the through hole 11j. The connection leads 4a,4c and 4d are then electrically connected to the terminal plates 20a–22a by electrical welding or soldering.

Although in the example shown in FIGS. 6 and 7 the sleeve 19 provided on the coupling member 9 and the insulating resin material with which this was filled are not provided, such components can be provided when necessary. In cases where the sleeve 19 and the insulating resin material are not provided, an insulating resin material is preferably provided locally to cover the connections between the connection leads 4a,4c and 4d and the terminal plates 20a–22a.

Besides the coupling members 9 and 10 described above, any other coupling member (not shown) may be prepared as necessary by integrally combining a terminal holding part having the same disposition of terminal plates as the terminal plates 13a–15a and 20a–22a of the coupling members 9 and 10 with a connector part having a different shape according to the form of the outside member to which the pressure sensor unit 1 is to be mounted.

With the preferred embodiment described above, in the mounting of the pressure sensor unit 1, from among the coupling members 9 and 10 (or other coupling members not shown), one is selected and used which has a connector part of a shape matching the form of the outside member to which the connection leads 4a,4c and 4d are to be electrically connected. In this case, since the terminal plates 13a–15a of the coupling member 9 and the terminal plates 20a–22a of the coupling member 10 are disposed in exactly the same way, the exit positions, length dimensions and shapes of the connection leads 4a,4c and 4d of the pressure sensor unit 1 may be exactly the same.

Consequently, even if there are numerous different forms of the member to which the connection leads 4a,4c and 4d of the pressure sensor unit 1 are to be connected, because it is only necessary to prepare pressure sensor units 1 having the same specifications, through mass-production benefits it is possible to realize cost reduction of the pressure sensor unit 1 and hence cost reduction of the whole device.

Because the terminal plates 13a–15a and 20a–22a are exposed on the same side, the work of electrically connecting the connection leads 4a,4c and 4d of the pressure sensor unit 1 to the terminal plates 13a–15a and 20a–22a by welding or soldering can be carried out extremely easily. Furthermore, since the connection leads 4a,4c and 4d (and the connection lead 4b for use as a test terminal) need only be made the minimum length necessary for connection to the terminal plates 13a–15a of the coupling member 9 or the terminal plates 20a–22a of the coupling member 10, there is no risk of the connection leads 4a–4d bending readily during production or assembly, thereby improving production yield and reducing production costs.

In practice, various other types of coupling members are prepared besides the coupling members 9 and 10. However, because the coupling members need only have a very simple construction using just a conducting material for the terminal plates and the terminal pieces and an insulating material for the terminal holding part and the connector part, and can be produced cheaply compared to the pressure sensor units 1, the benefit of the cost reductions obtainable through mass-production of the pressure sensor unit 1 outweighs the burden of preparing different coupling members.

Also, because the terminal plates 13a–15a and the terminal pieces 13b–15b are formed integrally by the same coupling leads 13–15 and the pairs of the terminal plates 20a–22a and the terminal pieces 20b–22b are formed integrally by the same coupling leads 20–22, electrically connecting together the terminal plates and the terminal pieces becomes unnecessary, thereby making it possible to achieve further cost reductions.

When the pressure sensor unit 1 is assembled to the coupling member 9 or 10, the connection leads 4a–4d of the pressure sensor unit 1 are inserted into the insertion holes 16a–16d of the coupling member 9 or the insertion hole 16a and the other insertion holes (not shown) of the coupling member 10. Because after this kind of insertion the connection leads 4a–4d are in a positioned state and the pressure sensor unit 1 is in a provisionally held state, the work of connecting the connection leads 4a,4c and 4d to the terminal plates 13a–15a or 20a–22a can be carried out easily and with a high degree of accuracy.

Because a pair of flat faces 17a for facilitating gripping with a gripping jig are formed on the coupling members 9 and 10, handling of the coupling member 9 or 10 can be carried out by a gripping jig of an assembly robot. Therefore, it is possible to connect the pressure sensor unit 1 to the coupling member 9 or 10 or to assemble the coupling member 9 or 10 to an outside member easily and with a high degree of accuracy.

Because as necessary an insulating resin material (not shown) is provided to cover the connections between the connection leads 4a,4c and 4d and the terminal plates 13a–15a or 20a–22a,the moisture resistance and the mechanical strength of these connections can be increased and the reliability and life of the device thus increased. In this case, in the example shown in FIGS. 2–5, a sleeve 19 for covering the terminal holding part 11 of the coupling member 9 is provided and the inside of this sleeve 19 is filled with the insulating resin material. With this construction the above-mentioned resistance to moisture and mechanical strength can be increased further and mechanical breakage of the coupling member 9 itself can be prevented.

Because the pressure sensor unit 1 and the 20 coupling members 9, 10 are respectively provided with a cutaway 2f and a projection 11c for effecting positioning and preventing rotation, when the pressure sensor unit 1 and the coupling member 9 or 10 are connected, it is possible to position the two easily, and, once connected, and there is no risk of an unintentional external force being applied to the connections between the connection leads 4a,4c and 4d and the terminal plates 13a–15a or 20a–22a,thereby increasing the reliability of those connections.

Figure 9:
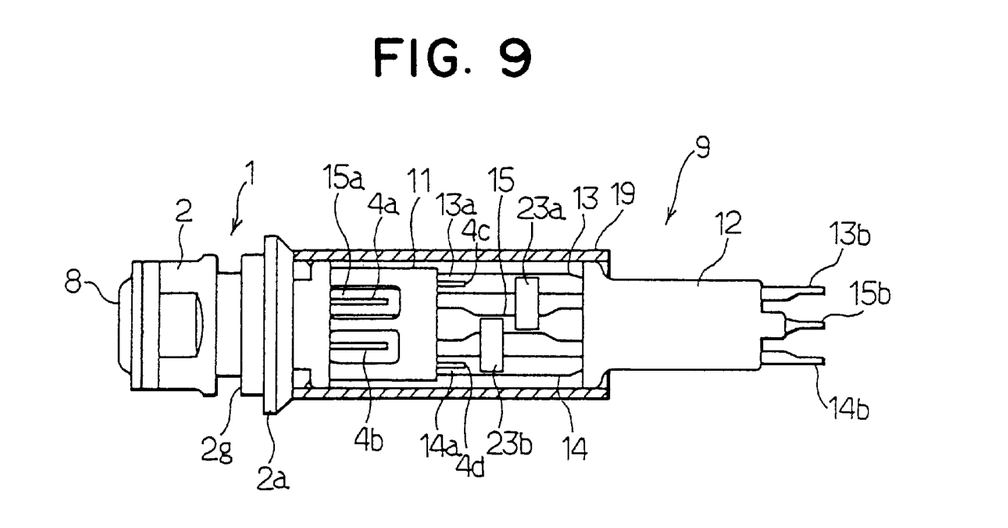
FIG. 9 is a view corresponding to FIG. 3 of a pressure-detecting device of a second preferred embodiment of the invention.

A second preferred embodiment of the invention is shown in FIG. 9, and parts of this second preferred embodiment differing from the first preferred embodiment will now be described.

Referring to FIG. 9, this second preferred embodiment has the characteristic that chip-form circuit devices 23a and 23b constituting a protection circuit or a noise-eliminating circuit such as a capacitor for the pressure sensor unit 1 are built in on the exposed parts of the coupling leads 13–15 in the coupling member 9 (particularly the exposed parts on the connector part 12 side). As an example, in the construction shown in FIG. 9, a circuit device 23a for use as a protection circuit is connected between the power supply terminal coupling lead 13 and the ground terminal coupling lead 15, and a circuit device 23b for use as a noise-eliminating circuit is connected between the signal output terminal coupling lead 14 and the ground terminal coupling lead 15.

With this preferred embodiment, not only can the operating reliability of the pressure sensor unit 1 be improved, but also the specifications of the protection circuit or the noise-eliminating circuit or other circuit can be changed easily. Furthermore, because it is only necessary to connect the circuit devices 23a, 23b between coupling leads 13–15 which are all exposed on the same side, the connections can be easily made.

Figure 10:
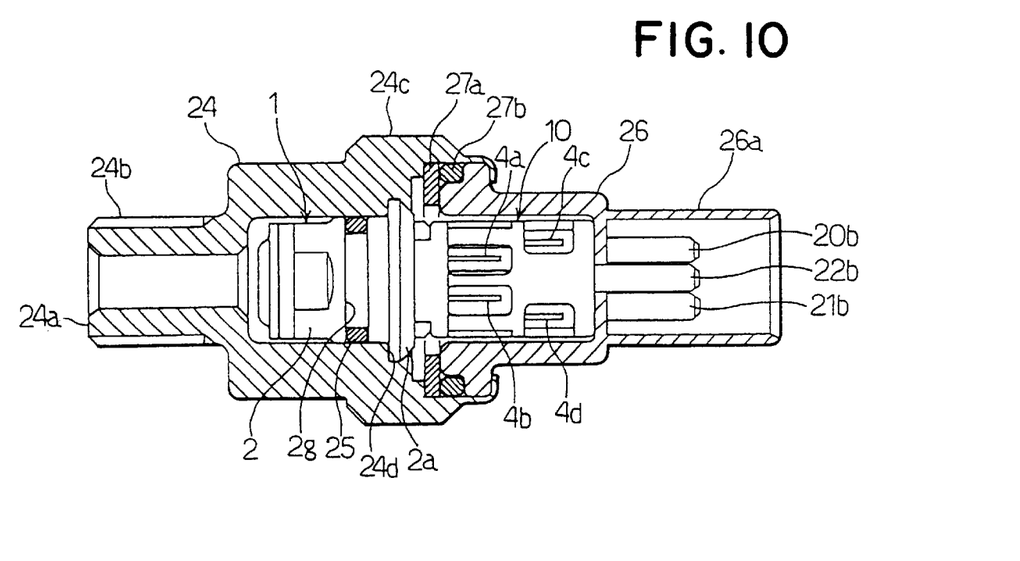
FIG. 10 is a sectional view of this device fitted to a metal housing.

A third preferred embodiment is shown in FIG. 10, and parts of this third preferred embodiment differing from the first preferred embodiment will now be described.

This third preferred embodiment is an example wherein the coupling member 10 of the first preferred embodiment is used and the pressure sensor unit 1 is received in a tubular metal housing 24. Specifically, the metal housing 24 is of a known construction having on the outside and front end of a pressure-receiving port part 24a a threaded part 24b to be screwed into a threaded hole (not shown) formed in a part for which a pressure is to be detected, and a cross-sectionally hexagonal tightening part 24c formed at its rear end.

The pressure sensor unit 1 is received inside the metal housing 24 after being assembled to the coupling member 10 and after an O-ring 25 is fitted in a groove 2g formed in the outside of the sensor housing 2. In this case, in its received state the pressure sensor unit 1 is positioned by the flange part 2a of the sensor housing 2 abutting upon a step 24d formed in the metal housing 24 and is fixed by a portion of the metal housing 24 crimped against the flange part 2a.

A resin connector housing 26 is provided at an opening at the opposite end of the metal housing 24 from the pressure-receiving port part 24a to cover the coupling member 10. Specifically, the connector housing 26 has a base end thereof received in the metal housing 24 with a spacer ring 27a and an O-ring 27b interposed therebetween, and in this received state is fixed by an edge portion around the opening of the metal housing 24 crimped against it. In this case, the terminal pieces 20b–22b of the coupling member 10 project into a terminal case 26a of the connector housing 26 and function as male terminals.

Figure 11:
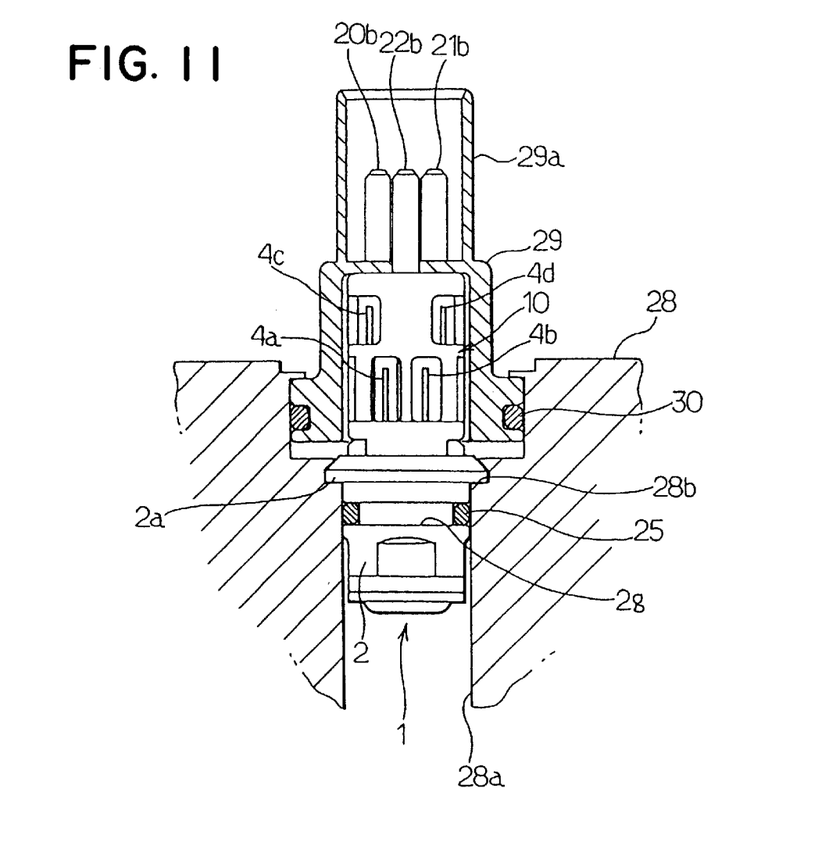
FIG. 11 is a similar view of a pressure-detecting device of a third preferred embodiment of the invention.

A fourth preferred embodiment of the invention is shown in FIG. 11, and parts of this fourth preferred embodiment differing from the first preferred embodiment will now be described.

This fourth preferred embodiment is an example wherein the pressure sensor unit 1 is mounted to a metal block 28 in which is formed a mounting hole 28a at a part where a pressure is to be detected. Specifically, the pressure sensor unit 1 is inserted into the mounting hole 28a of the metal block 28 after being assembled to the coupling member 10 and after an O-ring 25 is fitted in a groove 2g formed in the outside of the sensor housing 2. In this case, in its inserted state the pressure sensor unit 1 is positioned by the flange part 2a of the sensor housing 2 abutting upon a step 28b formed in the metal block 28, and is fixed by a portion of the metal block 28 crimped against the flange part 2a.

A resin connector housing 29 is provided at the port of the mounting hole 28a of the metal block 28 to cover the coupling member 10. Specifically, the connector housing 29 has a base end thereof fitted with an O-ring 30 and received in the mounting hole 28a, and is fixed in this received state by an edge portion around the port of the mounting hole 28a in the metal block 28 crimped against it. In this case, the terminal pieces 20b–22b of the coupling member 10 project into a terminal case 29a of the connector housing 29 and function as male terminals.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A pressure-detecting device comprising:
   a pressure sensor unit having a plurality of rigid connection leads extending therefrom;
   a coupling member for mounting the pressure sensor unit and having proximal and distal ends, the coupling member at the proximal end including an insulated terminal holding part having a plurality of terminal plates with connecting ends for electrically plugging into and connecting with the plurality of rigid connection leads, and at the distal end an insulated connector part having terminals electrically connected to the plurality of terminal plates;
   wherein the terminal holding part is interchangeable with coupling members of like structure to enable the pressure sensor unit to be mounted.

2. The pressure-detecting device of claim 1, further comprising a plurality of insertion channels formed in the terminal holding part and extending between the terminal plates and the pressure sensor unit, and into which the plurality of connection leads are inserted.

3. The pressure-detecting device of claim 1, wherein side outer faces of the terminal holding part define a pair of flat faces for facilitating gripping with a gripping jig.

4. The pressure-detecting device of claim 1, wherein the terminal plates are integrated with the terminals to form coupling leads.

5. The pressure-detecting device of claim 1, wherein the terminal plates and terminals are insert-molded.

6. The pressure-detecting device of claim 1, further comprising an insulating resin material covering connections between the connection leads and the terminal plates.

7. The pressure-detecting device of claim 6, further comprising a sleeve fitted around the terminal holding part, the sleeve being filled with the insulating resin material.

8. The pressure-detecting device of claim 1, wherein the coupling member has a built-in circuit device for the pressure sensor unit, the circuit device being one of a protecting circuit and a noise-eliminating circuit.

9. The pressure-detecting device of claim 1, further comprising interlocking means for accurately positioning the pressure sensor unit and the coupling member relative to one another and for inhibiting rotation of the pressure sensor unit and the coupling member relative to one another.

10. The pressure-detecting device of claim 1, wherein the terminal plates are all exposed at the proximal end of the insulated terminal holding part.

11. The pressure-detecting device of claim 1, wherein the terminal holding part includes concavities within which the connection leads and the terminal plates are connected.

12. The pressure-detecting device of claim 1, wherein the terminal holding part includes welding access apertures on a bottom side of the distal end corresponding to electrode/terminal plate contact locations.

13. The pressure-detecting device of claim 1, wherein the device is installed in one of an automotive hydraulic brake system and a diesel engine common rail injector.

14. A pressure-detecting device assembly comprising:
   a pressure sensor unit having a plurality of rigid connection leads extending therefrom;
   a terminal holding part having a plurality of terminal plates with respective connecting ends at a first end thereof for electrically plugging into and connecting with the plurality of connection leads; and
   a connector part having a plurality of terminals being electrically connectable to the plurality of terminal plates at a first end and the terminal pieces being electrically and mechanically adaptable at a second end, the terminal holding part and the connector part when assembled forming an elongate coupling member;
   the connector part being interchangeable with terminal plates of like structure thereby enabling the pressure sensor to be electrically and mechanically mounted.

15. The pressure-detecting device assembly of claim 14, further comprising a plurality of insertion channels formed in the terminal holding part and extending between the terminal plates and the pressure sensor unit into which the plurality of connection leads are inserted.

16. The pressure-detecting device assembly of claim 14, wherein outer faces of the terminal holding part define a pair of flat faces for facilitating gripping with a gripping jig.

17. The pressure-detecting device assembly of claim 14, further comprising an insulating resin material covering connections between the connection leads and the terminal plates.

18. The pressure-detecting device assembly of claim 17, further comprising a sleeve fitted around the terminal holding part, the sleeve being filled with the insulating resin material.

19. The pressure-detecting device assembly of claim 14, wherein the coupling member has a built-in circuit device for the pressure sensor unit, the circuit device being one of a protecting circuit and a noise-eliminating circuit.

20. The pressure-detecting device assembly of claim 14, further comprising interlocking means for accurately positioning the pressure sensor unit and the coupling member relative to one another and for inhibiting rotation of the pressure sensor unit and the coupling member relative to one other.

21. The pressure-detecting device assembly of claim 14, wherein the device is installed in one of an automotive hydraulic brake system and a diesel engine common rail injector.

22. A pressure-detecting device assembly comprising:
   a pressure sensor unit having a plurality of rigid, protruding, electrically conductive connection leads and a protruding cylindrical part encircling the connection leads, the cylindrical part having a cutaway portion;
   a terminal holding part configured to plug into the pressure sensor unit, the terminal holding part having a plurality of insertion holes, each hole being accompanied by a respective terminal plate for electrically receiving the rigid protruding, electrically conductive connection leads of the pressure sensor unit;
   a shelf-like encasement surrounding the terminal plates, the shelf-like encasement having a plurality of concavities to access the rigid connection leads and the terminal plates when engaged, the shelf-like encasement also having a plurality of flat surfaces for gripping;
   a coupling member having coupling leads which electrically connect to the terminal plates; and
   a connector part having a plurality of terminal pieces electrically connected to the terminal holding part by the coupling leads, each coupling lead corresponding to a terminal plate, each terminal plate corresponding to a connection lead of the pressure sensing unit;
   wherein the terminal holding part is interchangeable with coupling members and connector parts of like structure to enable universal mounting of the pressure sensor unit.

23. The pressure sensing device assembly of claim 22, further comprising:
   a sleeve encompassing the terminal holding part of the pressure sensor unit, the sleeve being filled with an insulating resin material.

24. The pressure-detecting device assembly of claim 22, further comprising:
   a projection on the terminal holding part to fit within the cutaway of the pressure sensor unit to prevent relative rotation between the pressure sensor unit and the terminal holding part.

* * * * *